Aug. 15, 1961    A. B. BASSOFF    2,995,941
RECIPROCATING DRIVE MECHANISM
Filed July 7, 1958    2 Sheets-Sheet 1
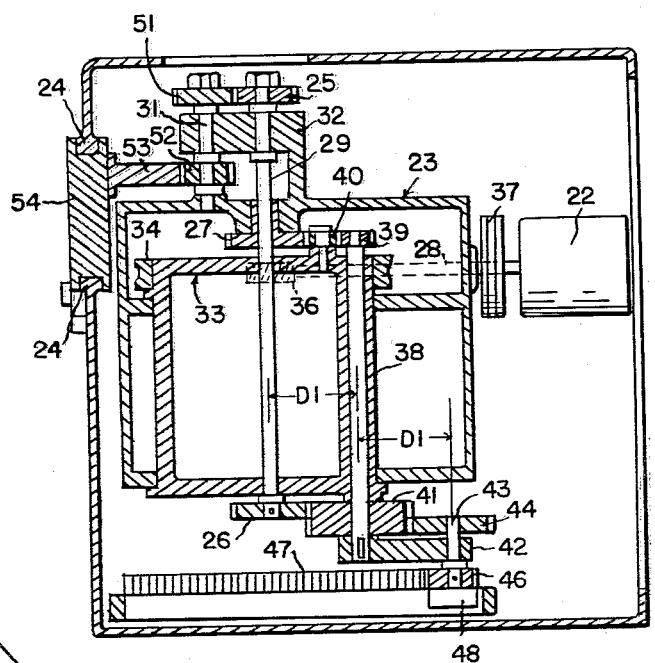
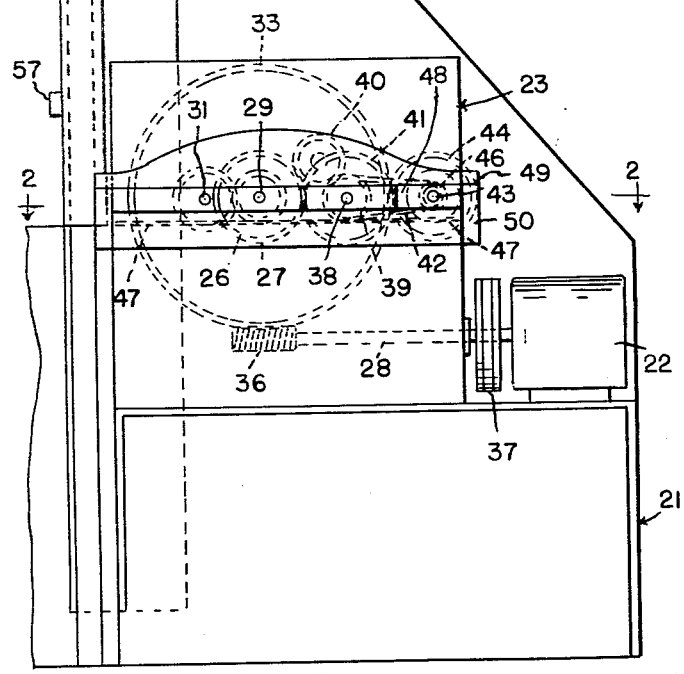
INVENTOR.
ARTHUR B. BASSOFF
BY
*Whittemore, Hulbert & Belknap*
ATTORNEYS Aug. 15, 1961  A. B. BASSOFF  2,995,941
RECIPROCATING DRIVE MECHANISM
Filed July 7, 1958  2 Sheets-Sheet 2
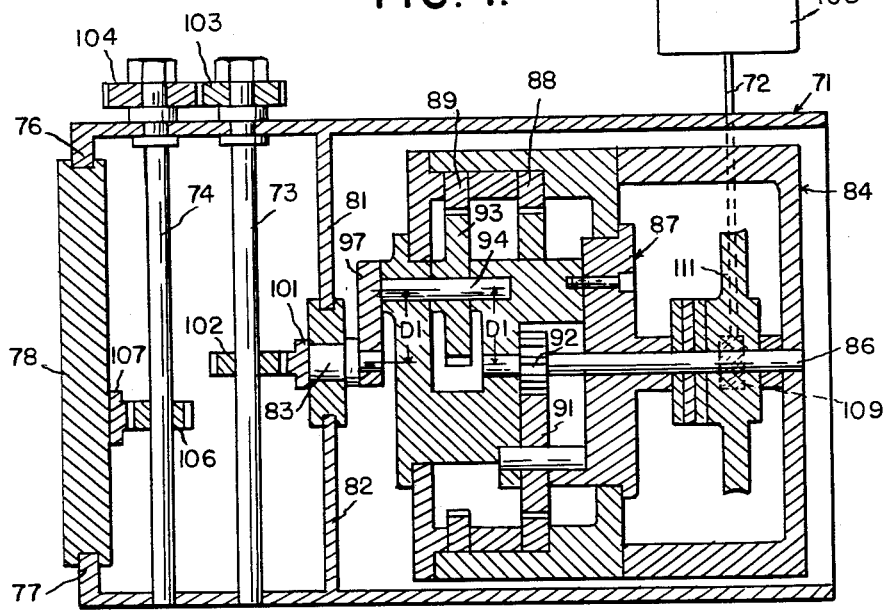
FIG. 4.
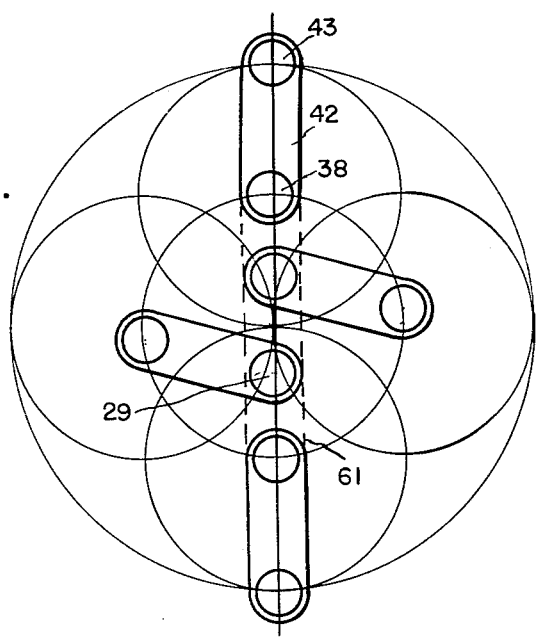
FIG. 3.
FIG. 5.
INVENTOR.
ARTHUR B. BASSOFF
BY
Whittemore, Hulbert & Belknap
ATTORNEYS

United States Patent Office 2,995,941
Patented Aug. 15, 1961

2,995,941
RECIPROCATING DRIVE MECHANISM
Arthur B. Bassoff, Detroit, Mich., assignor to National Broach & Machine Company, Detroit, Mich., a corporation of Michigan
Filed July 7, 1958, Ser. No. 747,052
13 Claims. (Cl. 74—52)

This invention pertains to an apparatus for converting rotary to reciprocal motion in a metal forming machine and more particularly to an apparatus which is adapted to be driven by an electric motor and has means for converting the rotary motion of the motor to intermittent reciprocating motion for a machine carriage.

A problem facing the art of constructing reciprocating metal forming machinery was the conversion of standard alternating current power supplies to repeated reciprocal motion of a carriage in a metal forming operation. Alternating current motors have not been found compatible with intermittent reversible operation and therefore motor-generator conversion units and other expensive means have been found necessary to provide the required intermittent reciprocal movements. This invention makes possible the desired machine movement by a structure which may be constantly driven by a non-reversible motor in a rigid, compact, and relatively inexpensive package. The structure for doing this includes a carrier or rotor driven about a center axis and carrying a planet pin, spaced from the axis. One end of the pin is provided with a gear member which is engageable with a centrally positioned fixed gear member in a ratio of 1:2 and fixed to the other end of the pin is a link which carries a member at a distance from the pin which is equal to the distance between the planet pin and the center axis. Rotation of the motor will cause this member to define a rectilinear reciprocating path having its center aligned with the center axis. Two embodiments are shown for accomplishing this purpose with the first embodiment employing an external gear and with the second embodiment employing an internal gear for enmeshing the planet pin gear.

It is therefore an object of this invention to provide means in a metal forming machine for converting rotary motor motion to reciprocating machine carriage motion in a simple, inexpensive and efficient manner.

An object of this invention is to provide means for converting rotary to reciprocatory motion including means for rotating a planet pin about a center axis and further means for causing a revolution of the planet pin about its own axis each time the planet pin revolves or orbits about the center axis so that a link member carried by said planet pin has a point thereon which defines a rectilinear reciprocal path as the planet pin revolves about the center axis and with said point being spaced from the planet axis the same distance that is between the planet and center axes.

It is an object to utilize unidirectional rotary motion to rotate about a center axis a planet pin having attached at one end gear means which mesh in a 1:2 ratio with a fixed gear and with the planet pin carrying at its other end a link member which has spaced therein from the planet pin axis a distance equal to the spacing between the center and planet pin axes a member which reciprocates in a rectilinear path.

It is a further object to provide in such a construction clutch means which are operable in response to travel of the reciprocating member to interrupt the planet pin rotation.

It is an object to provide in such a construction a counterweight for the reciprocating member which comprises a second member suitably proportioned and in geared relation with the first member to aid in the vertical movement of the first member.

These and other objects will become more apparent when preferred embodiments are described in conjunction with drawings in which:

FIG. 1 is a side elevational view of the first embodiment;
FIG. 2 is a section taken at 2—2 of FIG. 1;
FIG. 3 is a diagrammatic plan view of the embodiments shown herein;
FIG. 4 is a sectioned view of a second embodiment; and
FIG. 5 is a sectional view showing a modification providing a counterweight for the vertically reciprocating slide.

In FIGS. 1 and 2, base 21 supports motor 22, housing 23 and vertical ways 24. Housing 23 comprises a generally box-shaped member which provides bearing supports for motor shaft 28, center shaft 29 and gear shaft 31, with shafts 29 and 31 being supported in member 32 which extends laterally from housing 23. Shaft 29 fixedly carries at one end gear 25 and at the other end gear 26 and is journaled intermediate its length in gear 27 which is fixed to housing 23. Also journaled in housing 23 for rotation about the axis of center shaft 29 is rotor 33 which has fixed about one end an external worm gear 34 which meshes with worm 36 carried at the end of motor shaft 28 so that rotation of shaft 28 will perform a reduction drive to rotor 33. Intermediate shaft 28 is clutch 37 which is operable by limit switches later described.

Pivotally carried by rotor 33 is idler gear 40 which meshes with fixed center gear 27. Also pivotally carried at the outer circumference of rotor 33 a distance D1 from center shaft 29 is planet pivot 38 which has fixed at one end a planet gear 39 which meshes with idler gear 40 and is in a 1:2 ratio with gear 27. Fixed at the other end of pivot 38 is a second planet gear 41 and a linking member 42. Rotatably supported at the end of link 42 a distance D1 from planet pivot 38 is link pivot 43 which fixedly carries at one end gear 44 which meshes with gear 41 and at the other end gear 46 which meshes with base supported rack 47. Also fastened to the end of pivot 43 is a sliding block 48 which is intermediate guides 49, 50 which are vertically spaced and supported by base 21. Fixed to one end of pivot 31 is gear 51 which meshes with gear 25 and to the other end gear 52 which meshes with rack 53 which is fixed to slide 54. Slide 54 is mounted between ways 24 for vertical reciprocating movement and may carry a metal forming member, not shown. Limit switches 56, 57 are placed at the travel limits of slide 54 and when engaged by slide attached element 58, de-energizes clutch 37 to disengage the motor drive from motor shaft 28. The drive from the motor may be re-engaged after a time delay switch has timed out, or manually as preferred, without interrupting the unidirectional operation of motor 22.

FIGURE 3 is a diagrammatic view of the link 42 travel path and will be helpful in understanding the operation of the illustrated embodiments. Pivot axis 38, link 42 and axis 43 are shown in four positions of operation. These positions are described along with the description of operation for the embodiment in FIGS. 1 and 2.

Rotation of motor 22 drives worm 36 which rotates rotor 33 about the axis of shaft 29. Planet pivot 38, which is rotatably carried in rotor 33, is caused to orbit about shaft 29 and, since the ratio between fixed gear 27 and planet gear 39 is exactly 2:1, gear 39, and hence link 42, will rotate twice about axis 38 each time rotor 33 rotates once about center shaft 29. Since the distance D1 between the axis of center shaft 29 and the axis of planet pivot 38 is the same as distance D1 between the axis of planet axis 38 and the axis of pivot 43, pivot 43 will move in a rectilinear path 61, which parallels guides 49, 50, and for each complete revolution of rotor 33 will traverse path 61 first in one direction and then the other. The positions of the axes of pivots 38, 43 and connecting link 42 in FIG. 3 were taken at approximately 90° intervals of rotor rotation. Pivot 38 is turned counterclockwise about its axis while the link 42 is turned clockwise about pivot 38 as pivot 38 orbits around shaft 29 since gear 39 is driven through idler 40 during the orbit.

The reciprocating motion of pivot 43 is of a fixed length for a given dimension of D1, and in order to convert this fixed reciprocating stroke to a variable reciprocating stroke the following mechanism has been supplied. A gear 46 engages rack 47 and during the reciprocating action turns first in one direction about pivot 43 and then the other, which reciprocating rotary motion is transmitted through idler gear 41 to gear 26 which rotates gear 25 which in turn rotates gears 51 and 52 moving rack 53 and slide 54 in a reciprocating movement. By changing gears 25 and 51, a variable stroke is provided slide 54.

If desired, limit switches 56 and 57 may be tripped by element 58 at each end of the slide 54 stroke which would disengage clutch 37. Since slide 54 enjoys harmonic motion due to the arrangement shown diagrammatically in FIG. 3, a high mechanical advantage is available at the end of the slide stroke which results in two advantages. First, more force is available at the ends of the stroke and, second, slight relative movement occurs at the end of the stroke so that any irregularity in the operation of clutch 37 is minimized.

FIG. 4 shows a second embodiment wherein the planet pivot is rotated about its own axis as it orbits around the center shaft due to an engagement with an internal fixed gear. Frame 71 rotatably supports motor shaft 72 and change gear shafts 73, 74 and provides vertical ways 76, 77 which permit reciprocal sliding action of slide 78. Attached intermediate opposite walls of frame 71 are ways 81, 82 which slidably support for reciprocating motion crank pin 83. Located within frame 71 is housing 84 which rotatably supports shaft 86 which has fixed thereto sun gear 92 and carrier 87 for rotation about the axis of shaft 86 and fixedly supports internal gears 88, 89. Carrier or rotor 87 journals a planet gear 91 which meshes with internal gear 88 and gear 92 and carrier 87 rotatably supports a second planet gear 93 which meshes with internal gear 89 in a 1:2 ratio and which is supported on pin 94 having a distance D1 from the axis of shaft 86. Fixed to the free end of the pin 94 is link 97 which is pivoted at its opposite end a distance D1 from axis of pin 94 to crank pin 83 which carries rack 101 which in turn is in meshed engagement with gear 102 of shaft 73. Shaft 73 carries at one end change gear 103 which is in meshed engagement with change gear 104 carried by an end of shaft 74. Intermediate and fixed to shaft 74 is gear 106 which in turn is inmeshed engagement with slide attached rack 107. Motor 108 is fixedly supported relative frame 71 and drives worm gear 109 through motor shaft 72 which rotates gear 111 and shaft 86 to which it is fixed.

In the operation of the embodiment in FIG. 4 the rotation of shaft 72 by motor 108 rotates gear 111 and shaft 86 along with gear 92. This causes rotation of planet gear 91 which reacts against fixed internal gear 88 to rotate rotor 87. This in turn causes planet gear 93 and attached link 97 to orbit around shaft 86 and, since the ratio between gear 89 and gear 93 is exactly 2:1, for each revolution of pin 94 about shaft 86, gear 93 will revolve once about its own axis. This will impart rectilinear reciprocating motion to crank pin 83 which is attached a distance D1 from axis of pin 94. This motion is imparted to a variable drive by rotating gear 102 and shaft 73 resulting in rotation of shaft 74 through change gears 103 and 104. Rotation of shaft 74 reciprocates slide 78 between ways 76, 77 since gear 106 is meshed with slide attached rack 107. The stroke of slide 78 may be varied by changing gears 103 and 104.

Slides 54 and 78, which are designed to carry tool forming members, are preferably combined with the counter-weighted slide shown in the modification of FIG. 5. Slide 115, which may be either slide 54 or slide 78, is slidably supported at an outer end against way 116 and slide 117 is supported at an outer end against way 118. The inner ends of the slides engage a panel 119 which rotatably carries gear 121 which meshes with rack teeth 122, 123 formed on the inner ends of slides 115 and 117 respectively. The upward movement of one slide is aided by the downward movement of the other providing a counter-weight effect.

The drawing and the foregoing specification constitute a description of the improved apparatus for converting rotary to reciprocal motion in a metal forming machine in such full, clear, concise and exact terms as to enable any person skilled in the art to practice the invention, the scope of which is indicated by the appended claims.

What I claim as my invention is:

1. A metal forming machine having a reciprocating carriage for effecting metal removal comprising a machine base, a motor mounted to said base, motor driven rotating means pivotally mounted about a pivot center, and rotatably carrying a planetary pivot, a reciprocating pivot, a linking member connecting said planetary and reciprocating pivots for effecting reciprocating movement of said reciprocating pivot as said planetary pivot moves about said center axis, coupling means connecting said reciprocating pivot with the carriage, means for rotating said link about said planetary pivot as said pivot moves about said center so that said link member causes said reciprocating pivot to define a substantially rectilinear reciprocating path, clutch means connecting said motor from said rotating means, means responsive to carriage travel to disengage said clutch means, where said carriage comprises a pair of longitudinally slidable members, gear racks longitudinally attached to each of said members, a gear wheel engageable with both of said racks to that as one member moves in one direction the other member will move in the opposite direction providing a counterweight effect.

2. In a metal forming machine having a machine motor and reciprocable carriage that improvement comprising unidirectional rotary means rotatably mounted about a center axis, and rotatably carrying a planet gear rotatable about an axis spaced from said center axis, a gear rack, gear means engageable with said rack and said planet gear, a link connecting the axis of said planet gear and said gear means, a center gear being fixed to said center shaft and engageable with said planet gear, said center axis being midway between the limits of travel of said gear means along said rack and the axis of said planet gear being equally spaced from the axes of said center axis and said gear means, a fixed center gear, a second planet gear mounted coaxially with said first planet gear and engageable with said fixed gear, the ratio between said fixed and second planet gears being two to one, so that as said planet gear revolves about said center axis, said gear means will traverse said rack, changing the direction of rotation of said gear means during each traverse of said rack and in turn changing the rotative direction of the planet and center gears, a second gear rack, gearing connected to said center shaft engageable with and driving said second rack to provide reciprocating longitudinal motion, said gearing including change gears to provide a predetermined rack stroke.

3. A metal forming machine having a machine motor and reciprocating carriage comprising a planet carrier rotatable about a center axis and having a planet gear rotatable about a pivot axis spaced from and having a center axis, a fixed internal gear, said planet gear being meshed with said internal gear and having a ratio of 1:2 therewith, means being fixed to the planet gear pivot and having a reciprocating member located at a point spaced from the planet pivot axis equal to the spacing between said planet pivot axis and said center axis so that upon rotation of said carrier said reciprocating member will reciprocate in a rectilinear path with the travel limits of said reciprocatory movement being equally spaced from said center axis.

4. A metal forming machine having a machine motor and reciprocating carriage comprising a machine motor driven sun gear rotatably mounted about a center axis, a planet carrier rotatable about said center axis and having a planet gear rotatable about an axis spaced from said center axis, a fixed internal gear engageable with said planet gear so that said carrier is rotated when said sun gear is rotated, a second planet gear meshed with a second internal gear and having a ratio of 1:2 therewith, a link being fixed to the second planet gear and pivoted to reciprocating means at a point spaced from the second planet axis equal to the spacing between said second planet gear axis and said center axis so that upon rotation of said carrier said reciprocating means will reciprocate in a rectilinear path with the travel limits of said reciprocatory movement being equally spaced from said center axis.

5. A metal forming machine having a machine motor and reciprocating carriage comprising a machine motor driven sun gear rotatably mounted about a center axis, a planet carrier rotatable about said center axis and having a planet gear rotatable about an axis spaced from said center axis, a fixed internal gear engageable with said planet gear so that said carrier is rotated when said sun gear is rotated, a second planet gear meshed with said internal gear and having a ratio of 1:2 therewith, a link being fixed to the second planet gear and pivoted to reciprocating means at a point spaced from the second planet axis equal to the spacing between said second planet gear axis and said center axis so that upon rotation of said carrier said reciprocating means will reciprocate in a rectilinear path with the travel limits of said reciprocatory movement being equally spaced from said center axis, a rack being connected to said reciprocating means and movable therewith, a rotatably mounted gear engageable with said rack imparting reciprocal rotary motion to said gear, change gears being engageable with said rack engageable gear, a second rack engageable with said change gears, with the stroke of said second rack being controllable through said change gears.

6. A machine having a reciprocatory tool carriage comprising a planet pivot member, means for orbiting said member about a center axis, carriage connected reciprocating means being connected to said planet pivot member at a spacing from the axis of the planet member equal to that between said planet member and center axes, means for causing a revolution of said planet pivot member about its own axis each time said planet pivot member orbits about said center axis so that said reciprocating means is caused to define a reciprocatory path, said means for orbiting said pivot member including an external fixed gear and planet gear, said planet gear being fixed to said planet pivot member and engageable with said fixed gear in a ratio of 1:2.

7. A machine having a reciprocatory tool carriage comprising a planet pivot member, means for orbiting said member about a center axis, carriage connected reciprocating means being connected to said planet pivot member at a spacing from the axis of the planet member equal to that between said planet member and center axes, means for causing a revolution of said planet pivot member about its own axis each time said planet pivot member orbits about said center axis so that said reciprocating means is caused to define a reciprocatory path, said means for orbiting said pivot member including an internal fixed gear and planet gear, said planet gear being fixed to said planet pivot member and engageable with said fixed gear in a ratio of 1:2.

8. Reciprocating drive mechanism comprising a fixed external gear, a carrier rotatable about the axis of said fixed external gear, a pinion rotatable on said carrier and geared to said fixed gear, said pinion having one-half the number of teeth of said fixed gear, means for driving said carrier, a radially extending arm fixed to said pinion, a driver on said arm, said driver being spaced from the axis of said pinion by a distance equal to the spacing between the axis of said fixed external gear and the axis of said pinion, said driver being a pinion rotatable on said arm, a rack in position to mesh with said pinion as it is reciprocated by rotation of said carrier, a second rack and pinion set, and change gearing connecting said pinion to the pinion of said second rack and pinion set.

9. Mechanism as defined in claim 8 in which said change gearing includes an intermediate gear coaxial with said carrier.

10. Reciprocating drive mechanism comprising a fixed gear, a carrier rotatable about the axis of said fixed gear, a pinion on said carrier and geared to said fixed gear, said pinion having one-half the number of teeth of said fixed gear, an arm extending radially from said pinion and fixed thereto, a driver on said arm, said driver being spaced from the axis of said pinion by a distance equal to the spacing between the axis of said fixed gear and said pinion, a first rack and pinion device connected to said driver to produce rotation of the pinion of said first rack and pinion device in accordance with movement of said driver, a second rack and pinion device, and change gearing connecting the pinions of said rack and pinion devices.

11. Reciprocating drive mechanism comprising a frame, a fixed gear carried by said frame, a carrier rotatable about the axis of said fixed gear, a planet gear having half the number of teeth of said fixed gear rotatably mounted on said carrier and connected in driven relation to said fixed gear, means for driving said carrier in rotation, a driver fixed to said planet gear at a distance from the axis of said planet gear equal to the spacing between the axes of said fixed gear and planet gear, whereby rotation of said carrier results in rectilinear reciprocation of said driver, a first fixed rack extending along the path of reciprocation of said driver, said driver including a first pinion in mesh with said first rack, a second rack slidable longitudinally on said frame, gear means including a second pinion rotatable about a fixed axis on said frame and in mesh with said second rack, gearing connecting said first and second pinions including a driven gear located on the axis of said carrier and a gear rotatable on said carrier and in mesh with said driven gear and with said gear means.

12. Reciprocating drive mechanism comprising a frame, a fixed external gear carried by said frame, a carrier rotatable about the axis fixed gear, a planet gear having half the number of teeth of said fixed gear rotatably mounted on said carrier and connected in driven relation to said fixed gear, means for driving said carrier in rotation, a driver fixed to said planet gear at a distance from the axis of said planet gear equal to the spacing between the axes of said fixed gear and planet gear, whereby rotation of said carrier results in rectilinear reciprocation of said driver, a first fixed rack extending along the path of reciprocation of said driver, said driver including a first pinion in mesh with said first rack, a second rack slidable longitudinally on said frame, gear means including a second pinion rotatable about a fixed axis on said frame and in mesh with said second rack, gearing connecting said first and second pinions including a driven gear located on the axis of said carrier and a gear rotatable on said carrier and in mesh with said driven gear and with said gear means, said driven gear being fixed to a drive shaft journalled for rotation in said fixed gear.

13. Reciprocating drive mechanism comprising a frame, a fixed gear carried by said frame, a carrier rotatable about the axis of said fixed gear, a planet gear having half the number of teeth of said fixed gear rotatably mounted on said carrier and connected in driven relation to said fixed gear, means for driving said carrier in rotation, a driver fixed to said planet gear at a distance from the axis of said planet gear equal to the spacing between the axes of said fixed gear and planet gear, whereby rotation of said carrier results in rectilinear reciprocation of said driver, a first fixed rack extending along the path of reciprocation of said driver, said driver including a first pinion in mesh with said first rack, a second rack slidable longitudinally on said frame, gear means including a second pinion rotatable about a fixed axis on said frame and in mesh with said second rack, gearing connecting said first and second pinions including a driven gear located on the axis of said carrier and a gear rotatable on said carrier and in mesh with said driven gear and with said gear means, said gearing including change gears for changing the stroke of said second rack with reference to the stroke of said driver.

References Cited in the file of this patent

UNITED STATES PATENTS

| | | |
|---|---|---|
| 1,167,887 | Clarke | Jan. 11, 1916 |
| 1,203,481 | Carlson | Oct. 31, 1916 |
| 1,307,474 | Baldwin et al. | June 24, 1919 |
| 1,349,958 | Head | Aug. 17, 1920 |
| 1,438,492 | Johnson | Dec. 12, 1922 |
| 1,474,446 | Schroeder | Nov. 20, 1923 |
| 1,897,140 | Perez | Feb. 14, 1933 |
| 2,193,344 | Reece | Mar. 12, 1940 |
| 2,250,584 | Krueger et al. | July 29, 1941 |
| 2,299,007 | Bundy | Oct. 13, 1942 |
| 2,358,884 | Stegall | Sept. 26, 1944 |